United States Patent
Stedman

(10) Patent No.: US 7,381,336 B2
(45) Date of Patent: Jun. 3, 2008

(54) AUTOMATED WATER TREATMENT SYSTEM AND METHOD OF USE

(75) Inventor: Ken M. Stedman, Redondo Beach, CA (US)

(73) Assignee: MM Filtration Company, Lake Forest, CA (US)

( * ) Notice: Subject to any disclaimer, the term of this patent is extended or adjusted under 35 U.S.C. 154(b) by 52 days.

(21) Appl. No.: 10/685,917

(22) Filed: Oct. 14, 2003

(65) Prior Publication Data

US 2005/0077247 A1    Apr. 14, 2005

(51) Int. Cl.
*B01D 24/28* (2006.01)

(52) U.S. Cl. ............... 210/741; 210/786; 210/792; 210/97; 210/268

(58) Field of Classification Search ........... 210/741, 210/780, 786, 792, 793, 97, 137, 263, 268, 210/275
See application file for complete search history.

(56) References Cited

U.S. PATENT DOCUMENTS

| | | | | |
|---|---|---|---|---|
| 2,789,695 A | * | 4/1957 | Winkler et al. | 210/795 |
| 2,850,438 A | * | 9/1958 | Bodkin et al. | 208/304 |
| 3,512,640 A | * | 5/1970 | Hellmann | 210/741 |
| 3,595,385 A | * | 7/1971 | Duff | 209/1 |
| 4,197,201 A | * | 4/1980 | Hjelmner et al. | 210/189 |
| 4,246,102 A | | 1/1981 | Hjelmner et al. | 210/704 |
| 4,342,649 A | * | 8/1982 | Hughes | 210/108 |
| 4,496,464 A | * | 1/1985 | Hensley | 210/792 |
| 4,832,882 A | * | 5/1989 | Moylan | 264/39 |
| 5,277,829 A | | 1/1994 | Ward | 210/792 |
| 5,454,959 A | | 10/1995 | Stevens | 210/792 |
| 5,463,654 A | | 10/1995 | Bergmans | 375/341 |
| 5,833,867 A | * | 11/1998 | Hensley | 210/792 |
| 5,843,308 A | | 12/1998 | Suozzo et al. | 210/195.1 |
| 6,361,701 B1 | * | 3/2002 | Schade | 210/786 |
| 6,426,005 B1 | | 7/2002 | Larsson | 210/650 |

* cited by examiner

*Primary Examiner*—Frank M. Lawrence
(74) *Attorney, Agent, or Firm*—Gene Scott; Patent Law & Venture Group

(57) ABSTRACT

An automated method for controlling a solids inventory in a continuous backwashing upflow sand filter system treating a liquid inflow having impurities therein, includes the steps of: monitoring an influent inflow pressure and controlling the air pressure in an air lift pump to maintain a target ratio range between the size of a solids inventory of the system and the size of the sand bed of the system.

6 Claims, 1 Drawing Sheet

AUTOMATED WATER TREATMENT SYSTEM AND METHOD OF USE

BACKGROUND OF THE INVENTION

Incorporation by Reference

Applicant(s) hereby incorporate herein by reference, any and all U.S. patents, U.S. patent applications, and other documents and printed matter cited or referred to in this application.

FIELD OF THE INVENTION

The present invention relates to the treatment of water and wastewater, and more particularly, to a new and improved method and apparatus for controlling the removal of impurities and pollutants from water and wastewater by controlling each of the process' variables independently in a two-stage continuously operated granular media filtration system.

BACKGROUND OF THE INVENTION

In connection with municipal and many industrial water treatment systems, the water or wastewater (referred to herein simply as "water") needs to be purified. For example, one such system may be a drinking water system where drinking water is produced from surface water and another system may be a municipal wastewater treatment wherein the wastewater needs to be treated so that it can be discharged or reused in industry or for irrigation and similar purposes. In order for such treated water to be useful, pathogens, protozoans, phosphorus and other pollutants need to be removed from the water. More-over, organisms, such as Cryptosporidium and Giardia and their cysts, need to be removed as well.

In such a purification process, the water can be subjected to precipitation and/or flocculation. In this regard, conventional chemical purification can include one or more flocculation tanks in which the water is agitated with stirrers or agitators. Thereafter, the water passes through one or more sedimentation basins after appropriate chemicals have been added. One of the disadvantages of conventional chemical purification processes is the large area required for the flocculation tanks and sedimentation basins. A further disadvantage of conventional chemical purification techniques is the long duration that the water needs to remain in the flocculation tank as well as the sedimentation basin.

The use of flocculation tanks and sedimentation basins alone in the chemical purification process does not typically result in a high enough water purity for many applications. While membrane filtration with a suitably tight membrane can be used to attain a higher level of purification, such membrane filters are expensive and have other disadvantages. On the other hand, a granular media filter, for example, a sand filter, can be added at the end of the purification step to increase the purity of the water being treated. The sand in such sand filters must be cleaned. In some such filters, the sand is cleaned by back-washing it at frequent intervals. In order to avoid shutting down the purification step, it is necessary to provide at least two sand filters, one of which is in use while the other is being back-washed.

The use of two different, separately operated sand filters can be avoided if a continuously operated sand filter of the type disclosed in U.S. Pat. Nos. 4,126,546 and 4,197,201 is utilized. In such a sand filter, the filter bed is continuously cleaned while the filter is in operation. In this regard, the dirtiest sand is taken out of the filter bed, washed and returned to the clean part of the sand bed. In this way, the filter does not have to be taken out of operation for back-washing. A similar type of continuously operating sand filter also is disclosed in U.S. Pat. No. 4,246,102. As disclosed in that patent, the liquid is treated with chemicals before being treated in the sand filter.

In the sand filters of these patents, the liquid is introduced into the lower part of the filter bed. Filtration takes place upwards through the sand bed which is moving downward. In case the sand filter is operated with chemicals being added as disclosed in U.S. Pat. No. 4,246,102, then precipitation/coagulation and/or flocculation occurs during this filtration process. Most of the suspended solids in the feed will be separated near the feed level, which results in the dirtiest sand being in the lower part of the filter. The sand bed is kept in a slow downward motion by an air-lift pump that removes the dirtiest sand from a location close to the bottom of the filter tank. In the air-lift pump, the sand is subjected to a thorough mechanical agitation by the action of the air bubbles within the pump such that the dirt is separated from the grains of sand. The separated dirt is rinsed from the sand in a sand washer near the top of the air-lift pump, the sand washer being disposed concentrically around the upper part of the air-lift pump. The clean sand is returned to the top of the filter bed. Reject water is continuously removed from the sand washer and discharged from the sand filter whereas the filtrate exits from the sand filter as an overflow.

As is indicated in U.S. Pat. No. 4,246,102, the use of such a continuously operating sand filter with chemical treatment makes it possible to reduce the volume of liquid retained in the purification step to about one-tenth of that required for conventional processes. As a result, the area required for that step is reduced and the rate at which liquid passes through the purification step is increased. Moreover, considerably higher purity can be accomplished as compared to the purity attained with conventional techniques using flocculation tanks and sedimentation basins. Advantageously, the particulate filter material is being washed and returned to the filter bed continuously so that the filter material can accept a liquid which is quite dirty and/or contains considerable precipitates without any need for discontinuing the operation of the filter bed for the purpose of back-washing.

In order to further increase the purity level of the water being treated by such sand filters, two continuously operated sand filters can be operated in series with the filtrate exiting the first sand filter being introduced into the feed/input of the second sand filter. Such serial sand filters have been operated successfully in Europe (for example, in Holmsland, Denmark and Lairg, Scotland). However, the amount of reject from those filters and the amount of impurities in the reject makes it difficult and costly to dispose of the reject.

Another example where the sand filters of the type disclosed in U.S. Pat. Nos. 4,126,546, 4,197,201 and 4,246,102 are utilized is the wastewater management system disclosed in U.S. Pat. No. 5,843,308. This system includes two continuously operated sand filters of the type disclosed in U.S. Pat. Nos. 4,126,546 and 4,197,201 with direct filtration of the type disclosed in U.S. Pat. No. 4,246,102. According to U.S. Pat. No. 5,843,308, the sand filters are operated in series in order to eliminate or substantially reduce phosphorus, pathogens and protozoans; for example, Cryptosporidium and Giardia. Unlike the above noted European systems utilizing such sand filters in series, the reject water from the second sand filter is returned to the influent of the first sand filter and the reject water from only the first sand filter is directed to waste. It is the recirculation of the reject from the second sand filter back into the first sand filter that U.S. Pat. No. 5,843,308 asserts solves the problem of separating the above noted pollutants using the known method of operating two continuously operating sand filters in series. However, a system of the type disclosed in U.S. Pat. No. 5,843,308 does not actually provide a solution to the operation of sand filters in series, but instead creates a new and possibly more serious problem. In any such sand filter, the pollutants from the water being treated are concentrated in the reject (possibly in an order of magnitude of 20 times) that is discharged to waste. As a result, the reject from each sand filter has a high level of pollutants and in fact, the pollutants are in a significant concentration level within the reject. In view of the fact that flocculent fragments are difficult to separate from the reject without renewed precipitation and/or flocculation, the internal recirculation of the reject from the second sand filter that contains such pollutants to the input of the first sand filter results in the concentrated pollutants being returned to the first sand filter. This increases, rather than decreases, the chances that the pollutants will be in the treated water as it exits the second sand filter. Further, U.S. Pat. No. 5,843,308 indicates that the reject from the second sand filter is recycled into the first sand filter at a location downstream from the point where coagulants are added to the water that is being treated in the system. Therefore, the recycled reject from the sand filter is not subjected to a renewed coagulation and/or flocculation which would otherwise enhance the chances that pollutants would be separated in the first sand filter. U.S. Pat. No. 5,843,308 also indicates that the preferred coagulant is poly-aluminum-silicate-sulfate (PASS). However, that type of coagulant reacts so quickly that flocculation is essentially immediate. Hence, any coagulation/flocculation carried out in the water that is being supplied to the first sand filter is completed prior to the introduction of the reject from the second sand filter that is being recycled or reintroduced into the first sand filter.

In general, a system like the one disclosed in U.S. Pat. No. 5,843,308 wherein pollutants are separated by a two-step separation device and the pollutants separated in the second step are returned to the first step increases the risk for build-up and breakthrough of pollutants under real life operating conditions. In fact, the reliability of the system proposed in U.S. Pat. No. 5,843,308 is such that it might be necessary to supply a safety system consisting of two additional filter steps in series to those proposed in the patent to ensure that the separation will be reliable.

It is the unique operating method of the continuous backwashing upflow sand filter that allows the use of polymers and coagulants that would quickly clog traditional rapid sand filters. Through this unique capability and the fact that the pressures required to operate the filter are very low, that has resulted in the related patent literature cited in this document. In such filters control is generally limited to pacing the injection of polymer and chemicals in the inflows, and monitoring inflow and product flow rates. However, the prior art does not include improved methods of supervising and controlling such filter systems other than by manual observation and adjustment.

DESCRIPTION OF MOST CLOSELY RELATED ART

The following is the closest art defining the present state of this field:

Hjelmner et al., U.S. Pat. No. 4,246,102 describes a liquid to be purified passing first through a screen, a sand trap, a first sedimentation basin, an aeration basin and a second sedimentation basin, and then through a final purification step for chemical admixture and passage upwardly through a particulate filter bed. The particulate filter material is circulated continuously from the bottom of the filter bed through a washing device and the cleaned particulate material is deposited at the top of the filter bed. Sludge collected from the sedimentation basins and the washing device is treated in thickeners and digesters.

Ward, U.S. Pat. No. 5,277,829 describes a deep bed up flow filter for removing suspended solids from an influent stream to provide a clean filtrate, comprising an upright vessel having a vertical axis, top and bottom ends and contiguous upper, lower, and intermediate regions between the ends. The upper region contains filtrate up to a first elevation and an outlet (30) for drawing the filtrate out of the vessel. The intermediate region contains particulate filter media for removing the suspended solids from influent moving upwardly through the media as the media, dirtied with solids, moves downwardly into the lower region. The lower region is generally tapered inwardly toward the vessel bottom and contains dirty media that has moved downwardly from the intermediate region. Influent is introduced between the intermediate and lower regions, and the dirty media is collected at the bottom and transported to a regenerative washing compartment. A portion of the reject flow from the wash compartment is delivered to the dirty media in the lower region of the vessel and another portion is delivered to the area where the dirty media is collected and transported. This latter portion is preferably introduced into a collection conduit through a pipe having a concentric inner tube by which air is injected to fluidize and move the mixture of air, dirty media, and reject water in the conduit toward an airlift.

Stevens, U.S. Pat. No. 5,454,959 describes a moving bed filter in which the liquid to be filtered is introduced into an internal chamber centrally disposed in the filter bed. The liquid flows through the filter bed to filtration nozzles, which are disposed near the outer periphery of the filter bed. A portion of the filter bed media is continuously removed from a recessed chamber below the floor of the filter bed, transported by gas lift through a lift conduit to a wash box located above the filter bed, and cleaned by a countercurrent flow of the filtrate.

Bergmans, U.S. Pat. No. 5,463,654 describes a data receiver with a detection means that is used for determining a symbol value from the received signal. For reducing the effect of cyclostationary noise signals, a number of simultaneously operating detectors are used which derive a sequence of symbols from the input signal sampled at different instants. On the basis of a reliability measure simultaneously derived by the detectors, the symbol sequence whose associated reliability measure expresses the greatest reliability is conveyed to the output of the receiver with the aid of selection means.

Suozzo et al., U.S. Pat. No. 5,843,308 describes a dual-stage, gravity continuously backwashed filtering system for filtering contaminants from wastewater. This filtering system has a first sand-filter unit that is loaded with wastewater influent. The filtering system has injection points for coagulation chemicals and disinfection chemicals. The first sand-filter unit is connected in series to a second sand-filter unit of similar design. The first sand-filter unit is made up of large-grained sand, the second sand-filter unit fine-grained sand. The second sand-filter unit receives its influent from the effluent weir of the first sand-filter unit. The reject water from the second filter unit is re-introduced into the influent that is fed to the first filter unit. The reject matter from the first filter unit is passed to waste.

Larsson, U.S. Pat. No. 6,426,005 describes a treatment system for treating water including two continuously operating granular media filters that are operated together in series. The water to be treated is introduced as an influent into the first of the granular media filters and is treated therein. Treated, processed water or effluent is produced as is a first reject which contains impurities separated from a granular media bed in the first granular media filter and which is discharged from the first granular media filter. The effluent from the first granular media filter is further filtered in the second continuously operating granular media filter such that the effluent from the second granular media filter is clarified water and a second reject discharged from the second granular media filter contains impurities separated from a granular bed in the second granular media filter. In order to reduce the pollutants in the first and second rejects, the first and second reject water being discharged from respectively the first and second continuously operated granular media filters is separately treated by gravity separation, membrane filtration, two stage or multistage filtration or any combination thereof so that cleaned water is created that meets quality standards and a sludge is created that can be disinfected and/or dewatered and processed by suitable hygienic measures. In addition, chemicals for coagulation/flocculation may be added and the liquid to be processed may be subjected to a disinfecting treatment and/or a mechanical, biological and/or chemical treatment.

Our prior art search with abstracts described above teaches: a sequential descending bed filterer with reject of wash water containing impurities being fed to a separate unit for elimination of impurities, a method for separating pollutants from liquid, a deep bed sand filter, moving bed filters, a transmission system with increased sampling rate detection, and a wastewater management system, but does not teach a system capable of improved water filtration quality by more finely and continuously controlling solids inventory in a polymer membrane. The present invention fulfills these needs and provides further related advantages as described in the following summary.

SUMMARY OF THE INVENTION

The present invention teaches certain benefits in construction and use which give rise to the objectives described below.

Efficient operation in the present filter system is achieved by providing controls that accurately deliver the amount of air introduced into the air lift linked to an influent head pressure gauge that continually monitors the head pressure. This linkage allows the movement of the sand bed to be increased or decreased relative to the size and capability of the solids inventory. When the head pressure begins to increase it is an indication that the solids inventory has begun to exceed the critical mass required to provide proper filtration results and a decrease in head pressure is an indication that the critical mass is below what is required.

The control system includes a head pressure monitor that, due to the type of water being filtered, i.e., there is often a layer of foam on the surface of the water within the inlet column, is able to measure head pressure to within fractions of a centimeter. The influent flow monitor is of the type able to provide accurate results in water that may contain some debris that would foul paddle wheel type devices. The air flow controller is able to sense flow rate and able to adjust the flow rate by a signal from a remote controller. Such a flow rate monitor requires only a limited pressure drop to function properly and provide real time data on operating rate. A computer or programmable logic controller operates to control operation at optimum filtration quality. Inputs of data are logged and compared to historical information, including the operating parameters of head pressure, turbidity, influent flow rate, chemical polymer usage, and air flow rate. This data is then used to continually make the alterations necessary to air inflow to maintain head pressure for producing acceptable effluent quality.

Accordingly, it is an object of the present invention to provide a new and improved method and apparatus for the treatment of water that produces a desired purity level in an effluent while operating a filter device at its optimum throughput for a given quality of influent.

Another benefit of the present invention is that a single filter tower system is able to provide filtering and scrubbing performance equivalent to and better than common dual tower systems.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawing illustrates the present invention. In such drawing

DETAILED DESCRIPTION OF THE INVENTION

Figure 1:
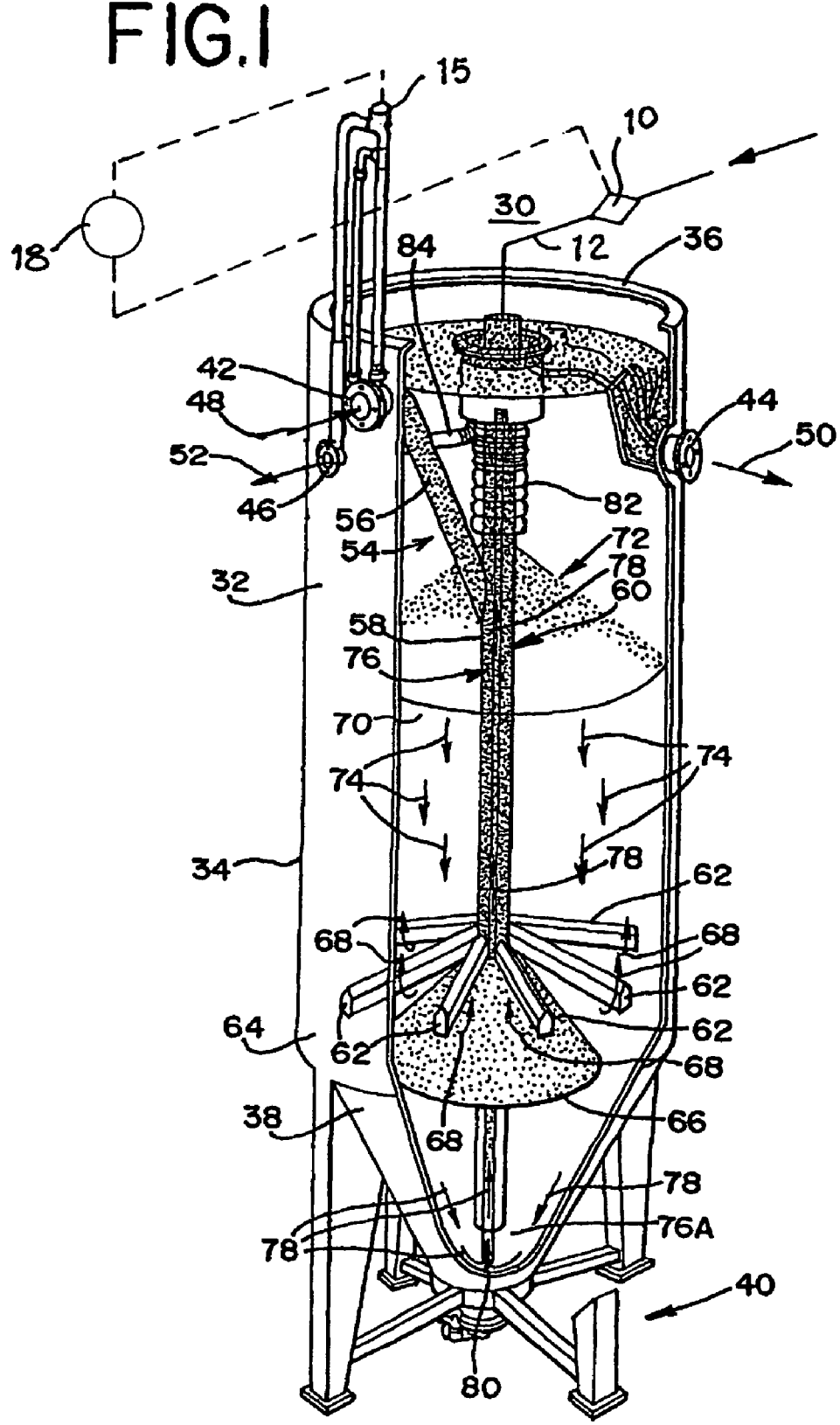
FIG. 1 is a perspective cutaway view of the preferred embodiment of the invention showing placement of controls and, by dashed line, signal interconnection with a computer or similar device.

The above described drawing figures illustrate the invention in at least one of its preferred embodiments, which is further defined in detail in the following description. Those having ordinary skill in the art may be able to make alterations and modifications in the present invention without departing from its spirit and scope. Therefore, it must be understood that the illustrated embodiments have been set forth only for the purposes of example and that they should not be taken as limiting the invention as defined in the following.

In the present invention, illustrated in FIG. 1, the sand filter 30 includes an outer housing or tank 32 having an outer, generally cylindrically shaped wall 34 extending from a top end 36 to a funnel-shaped bottom portion 38. The tank 32 is supported by a stand assembly 40 so that the tank 32 can be disposed in a vertical orientation with the stand assembly 40 extending downward from the outer wall 34 and around the funnel-shaped bottom portion 38. The sand filter 30 includes an inlet port 42 and outlet ports 44 and 46. As indicated by an arrow 48, untreated water/wastewater (influent) is introduced into the tank 32 of the sand filter 30 through the inlet port 42, and is discharged (effluent) from the outlet port 44 indicated by arrow 50, while reject from the sand filter 30 is discharged from the outlet port 46 as shown by arrow 52.

The influent to be treated is introduced through the inlet port 42 and flows in the direction of the arrow 48. The influent flows from the inlet port 42 through an inlet or feed duct 54 that includes a diagonally oriented duct portion 56 and a vertically oriented duct portion 58 that extends concentrically about a central vertical riser 60. From there, the influent flows to distribution arms or hoods 62 that extend radially from the riser 60 near a lower portion 64 of the wall 34 and just above or through an upper part of a funnel-shaped hood 66. The influent is discharged into the tank 32 from the lower portions of these distribution hoods 62 as is represented by arrows 68. A filter medium such as a sand bed 70 fills the tank 32 from the bottom funnel-shaped portion 38 to a level generally indicated by the reference numeral 72. The discharging of the influent from below the distribution hoods 62 tends to prevent the filter medium from coming in direct contact with outlets in the distribution hoods 62. By this arrangement, the risk of clogging of the outlets in the distribution hoods 62 by the filter medium close to the outlets is reduced. As further indicated by the arrows 68, the influent will rise upward in the tank 32 so that it flows through the sand bed 70.

The influent being discharged from the distribution hoods 62 includes a chemical coagulant such as polyaluminum-chloride, which is well known in treating municipal water systems. This chemical is introduced into the influent at inlet 42 and is the chief means by which debris is captured in the sand bed. As the influent rises through the sand bed 70 filtration of the influent takes place and the filter medium and chemical (also referred to as a polymer membrane) moves slowly downward in the tank 32 as indicated by arrows 74. The arrangement of the distribution hoods 62 in the lower part of the filter bed 70 has the advantage that most of the suspended solids (debris) in the influent will be separated near the level at which the distribution hoods 62 are disposed. As a result, the most dirty portion of the filter medium continues downwards and is no longer utilized in the filtration process until it has been cleaned, while the influent moves upward and is cleaned as it does.

The slow downward movement of the filter medium in the sand bed 70 is caused by removal of sand by an air-lift pump 76 that extends in the riser 60. Compressed air is supplied to an air lift chamber at 76A of the air-lift pump 76 near the bottom of the riser 60 through an air supply line (not shown) extending down through the riser 60. The air is introduced into the air-lift pump 76 from the air chamber at 76A. The air lift pump 76 will contain a mixture of the influent liquid, air and the filter medium during operation thereof. This mixture has a lower density than the surrounding liquid causing the mixture to rise in the air-lift pump 76. As this mixture rises, filter medium and liquid near the bottom of the bed 70 in the funnel-shaped bottom portion 38 of the tank 32 flows as indicated by arrows 78 through an inlet 80 of the air-lift pump 76 extending out of the lower part of the riser 60. By having the inlet 80 near the bottom of the tank 32, the dirtiest of the filter medium tends to flow into and upward in and by the air-lift pump 76.

As the dirty filter medium flows upward in the air-lift pump 76, it is subjected to a thorough mechanical agitation by the action of the air bubbles within the air-lift pump 76 and the dirt is separated from the grains of sand. The mechanical agitation and turbulence created by the action of the air bubbles in the air-lift pump 76 is so intense that microorganisms are killed. In order to further clean the sand particles, the sand is washed in a washer 82 which is located near the top end of the riser 60 and disposed concentrically around the air-lift pump 76. The cleaned sand from the washer 82 is returned to the top of the sand bed 70 whereas the reject from the washer 82 flows from the washer 82 through a discharge duct 84 so as to be discharged through the outlet port 46 as indicated by the arrow 52. On the other hand, the treated water or filtrate flows as an overflow near the top 36 of the tank 32 and is discharged as an effluent through the outlet port 44 indicated by the arrow 50.

The basic filter system of the present invention, as described above, is the same as that described in Larsson U.S. Pat. No. 6,462,005, which is incorporated into this document by reference. However, the present invention improves on the apparatus and manner of operation of the Larsson system by incorporating certain critical monitors and controls as described below.

Preferably, a liquid water level monitor 15 is positioned at the inlet 42, and this monitor 15 may be model number AGS-6F produced by Consilium US, inc., Littleton, Mass., or any similar or equivalent device. This monitor 15 is adapted for sensing the water level in the vertical pipe rising from inlet 42. This water level is a measure of back pressure at the inlet 42, and is also an indication of the rate of inflow of the influent; see arrow 48. Other methods of sensing the inflow rate or the back pressure will be known by those of skill in the art and are considered as operational equivalents to the Consilium device. A signal from the level monitor 15 is processed by computer 18 and a control signal is then generated by the computer and sent to air flow rate monitor and controller 10, which is preferably a mass flow controller such as model number MC-50 SLPM-D manufactured by Alicat Scientific, Inc., Tuscon, Ariz. However, alternative controllers suitable for this purpose would be considered to be operational equivalents to the Alicat device. This controller 10 is positioned in air inlet line 12. The control signal is responsible for adjusting the rate of air flow to air lift pump 76. Thus, as can be seen, this system is able to maintain a target ratio range between the size of the solids inventory and the size of the sand bed 70 within the system. Such a ratio is generally between about ten and thirty and is a measure of system performance. As the solids inventory increases the head pressure at inlet 42 increases as well because the chemical membrane tends to coagulate forming a continuous blanket within the sand bed so that water is impeded from percolating upward in the sand bed. The air inlet flow rate at inlet 12 is adjusted to maintain head pressure (also referred to as back pressure) within a target range by slowing or quickening the removal of the chemical membrane.

This functionally maintains the target ratio discussed above. The controller 10 and the monitor 15 are interconnected (dashed line in FIG. 1) for signal processing with computer or programmable controller 18 which is programmed to maintain optimal operation of the system.

Consider two extreme operating conditions; one where the filter media (sand) moves downwardly too slowly and the other where the filter media moves too quickly. In the first instance, the chemical, which coagulates to form a membrane that entrains the solids and other debris removed by the system, will eventually reach the top of the sand bed and contaminate the relatively clean process water above. In the second instance, the membrane will not properly form at all; not having enough time, so that proper debris capture does not occur, again resulting in less than optimal performance. To maintain operation between these two extremes is critical to satisfactory system performance (optimization). This is accomplished by indirectly monitoring head pressure at the influent inlet 42 and controlling air flow rate to the air-lift pump 76.

The above described apparatus is used in an automated method for controlling the solids inventory, i.e., the solid debris captured by the chemical membrane. This method includes monitoring the water head pressure (back pressure)

at inlet 42 and then using this information in adjustment the air flow rate in the air lift pump 76 to maintain the target ratio range between the size of a sand bed 70 and a size of the solids inventory as described above. The method further preferably comprises the step of establishing a set of optimal operation initial set points based on the quantity of polymer used, a normal and desired air lift rate, and taking into account the turbidity expected in the inflow and desired or needed in the outflow. The method further preferably comprises the step of adjusting the air flow rate at inlet 12 to maintain a selected quality in the outflow over a selected range of inflow rates and the desired quality level. Finally, the method uses a computer or programmable logic controller operating with a proprietary program that is able to control operation at optimum filtration rates. Such a program would be within the skill of one familiar with the control of industrial processes. Inputs of data are logged and compared to historical information, including the operating parameters of head pressure, turbidity, influent flow rate, chemical polymer usage, and air flow rate. This data is then used to continually make the alterations necessary to the air inflow to maintain head pressure for producing acceptable effluent quality.

The words used in this specification to describe the invention and its various embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or elements of this described invention and its various embodiments are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the invention and its various embodiments below or that a single element may be substituted for two or more elements in a claim.

Changes from the claimed subject matter as viewed by a person with ordinary skill in the art, now known or later devised, are expressly contemplated as being equivalents within the scope of the invention and its various embodiments. Therefore, obvious substitutions now or later known to one with ordinary skill in the art are defined to be within the scope of the defined elements. The invention and its various embodiments are thus to be understood to include what is specifically illustrated and described above, what is conceptually equivalent, what can be obviously substituted, and also what essentially incorporates the essential idea of the invention.

While the invention has been described with reference to at least one preferred embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. An automated method for controlling a solids inventory in a continuous batckwashing up flow sand filter system treating a liquid inflow having impurities therein, the method comprising the steps of: monitoring an inflow head pressure at an influent inlet; converting said head pressure to an equivalent communication signal input to a computer; controlling an air inflow rate in an air lift pump to maintain a target ratio range between a size of a captured solids inventory of the system and a size of a sand bed of the system; and establishing a set of optimal operation initial set points based on a quantity of polymer used, a normal air lift rate, end an expected inflow and outflow turbidity.

2. The method of claim 1 further comprising the step of adjusting the air flow rate to maintain a selected effluent quality over a range of influent flow rates for a selected inflow quality.

3. The method of claim 2 further comprising the step of controlling head pressure and influent flow rate in light of past operating data for optimal performance.

4. An automated continuous backwashing upflow sand filter system apparatus for treating a liquid inflow having impurities therein so as to control a solids inventory, the apparatus comprising: a sand filter having a sand bed filled tank with an inlet port receiving the liquid inflow and an outlet port discharging an effluent; a water level monitor positioned at the inlet port thereby sensing a water level in a vertical pipe rising from the inlet port; an air flaw rate monitor and controller receiving a control signal directing a rate of air flow to a lift pump thereby maintaining a target ratio range between a size of a solids inventory and a size of a sand bed within the system apparatus.

5. The apparatus of claim 4 further comprising a diagonally oriented duct portion and a vertically oriented duct portion extending concentrically about the vertical pipe.

6. The apparatus of claim 5 further comprising radially oriented distribution arms extending from the vertical pipe within a lower portion of the sand bed.

* * * * *